United States Patent [19]

Ogle

[11] 3,882,909
[45] May 13, 1975

[54] TRANS-A-JET 1
[75] Inventor: Robert W. Ogle, Newport Beach, Calif.
[73] Assignee: IMS Limited, South El Monte, Calif.
[22] Filed: July 5, 1973
[21] Appl. No.: 376,587

[52] U.S. Cl. .................. 141/286; 128/272; 141/329
[51] Int. Cl. ............................................... B65b 3/04
[58] Field of Search ..... 128/272; 137/575; 141/285, 141/309, 329, 330, 19; 23/293, 299; 206/47 A, 63.2 R, 63.4; 222/80, 189; 285/3, 4

[56] References Cited
UNITED STATES PATENTS
3,745,831   7/1973   Rothstein et al.................... 141/329
FOREIGN PATENTS OR APPLICATIONS
1,122,616   5/1956   France................................ 128/272

Primary Examiner—Houston S. Bell, Jr.
Attorney, Agent, or Firm—Wills, Green & Mueth

[57] ABSTRACT

This patent describes a fluid transfer device comprising two parallel fluid passages, both carried by a flange which is generally perpendicular to said passages.

The combination of a fluid transfer device comprising two parallel fluid passages, both carried by a flange which is generally perpendicular to said passages, and a common cover for the one end of each said fluid passage, said cover forming a fluid tight seal with the exterior of said passages and abutting said flange. The combination of a fluid transfer device comprising two parallel fluid passages, both carried by a flange which is generally perpendicular to said passages, and a common cover for the one end of each said fluid passage, said cover forming a fluid tight seal with the exterior of said passages and abutting said flange and a medicament container having an open end, an imperforate rubber stopper in said open end which seals said container, the one end of each of said fluid passages being adapted to pierce said stopper with said flange abutting the exterior of said stopper, and said cover sealing the interior of said container against contamination.

1 Claim, 16 Drawing Figures

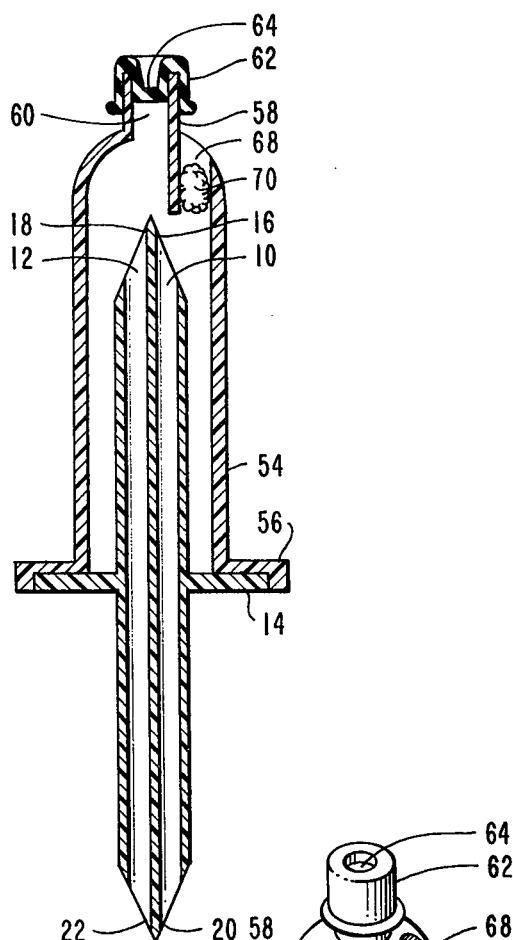
FIG.—7
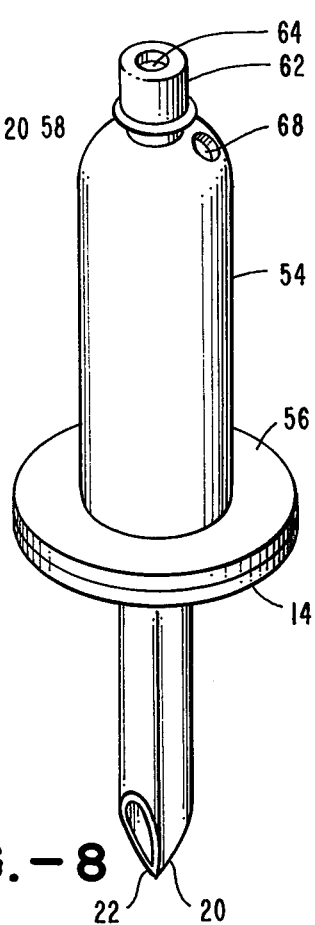
FIG.—8
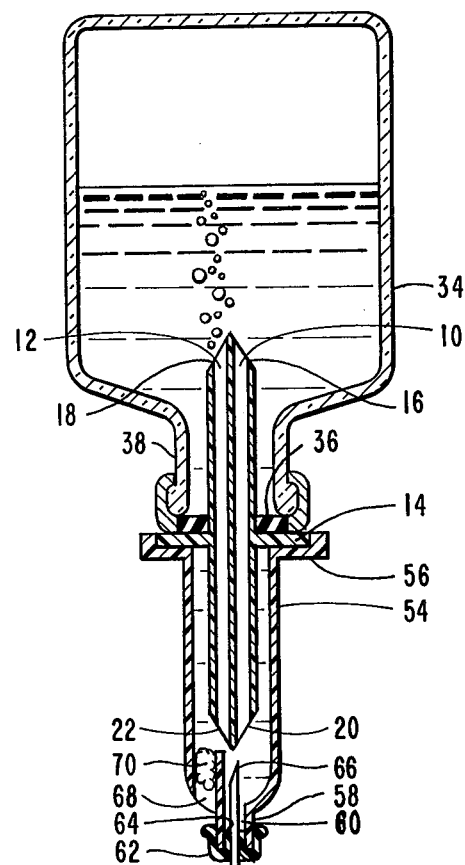
FIG.—16

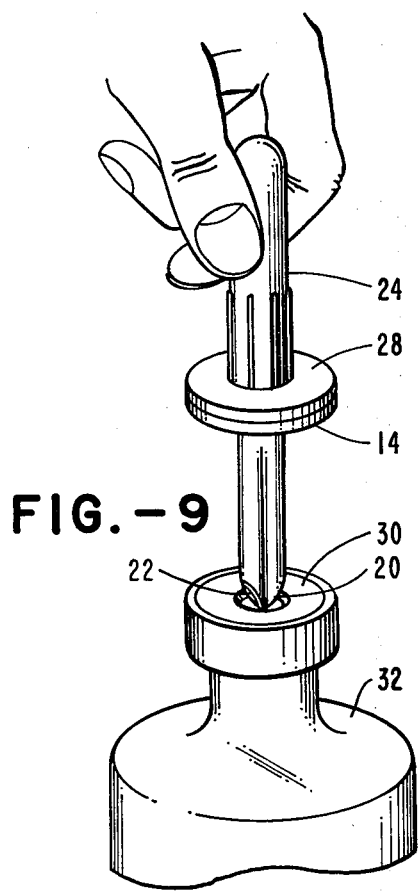
FIG.—9
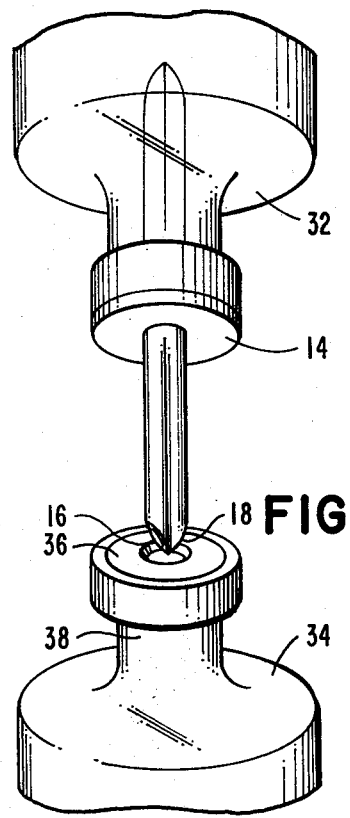
FIG.—11
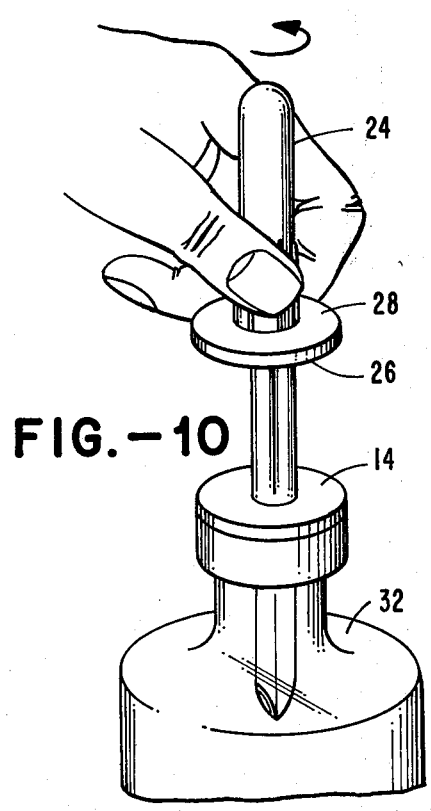
FIG.—10
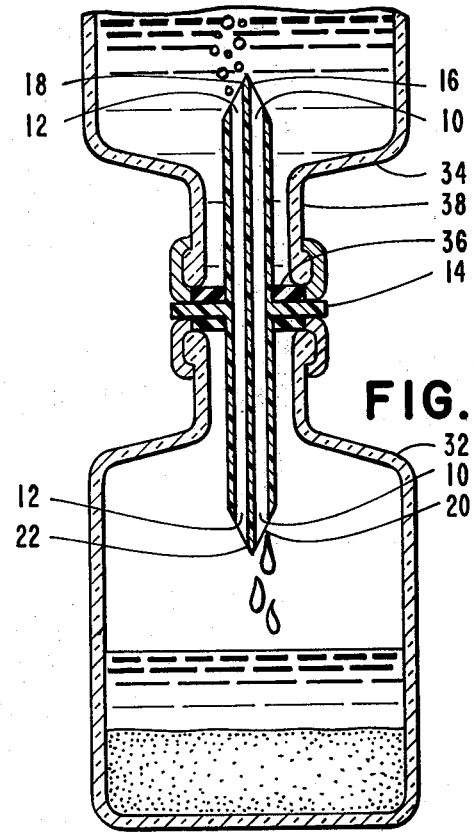
FIG.—12

TRANS-A-JET 1

BACKGROUND OF THE INVENTION

Many medicaments are prepared, stored and supplied in dry or lyophilized form. Such medicaments must be reconstituted at the time of use by the addition of a diluent thereto. Various methods of adding the diluent to the dry or lyophilized medicament have been used. One method in common use is the "open-pour" technique in which the diluent, such as a bottle of intravenous solution, is opened and some of the contents poured into the vial or bottle containing the dry or lyophilized material. After reconstitution, the liquid is usually returned to the intravenous solution bottle or vial, or other source of diluent. This technique is unsatisfactory because both the dry or lyophilized material and the diluent are exposed to ambient airborne bacterial contamination.

Another procedure is the "intravenous set transfer" technique which requires not only an intravenous solution set and stand, but also a needle for venting or a special dispensing cap.

It is also possible to accomplish reconstitution using an ordinary syringe to transfer diluent into the container for the dry or lyophilized material. In this operation, the needle is exposed to constant airborne contamination.

The present invention is concerned with solving and a avoiding the problems associated with the prior art. It is to be expected that this invention will be rapidly adapted by hospital personnel.

SUMMARY OF THE INVENTION

Briefly, the present invention comprises a fluid transfer device comprising two parallel fluid passages, both carried by a flange which is generally perpendicular to said passages. This invention further comprises the combination of a fluid transfer device comprising two parallel fluid passages, both carried by a flange which is generally perpendicular to said passages, and a common cover for the one end of each said fluid passage, said cover forming a fluid tight seal with the exterior of said passages and abutting said flange. The invention also includes the combination of a fluid transfer device comprising two parallel fluid passages, both carried by a flange which is generally perpendicular to said passages, and a common cover for the one end of each said fluid passage, said cover forming a fluid tight seal with the exterior of said passages and abutting said flange, and a medicament container having an open end, an inperforate rubber stopper in said open end which seals said container, the one end of each of said fluid passages being adapted to pierce said stopper with said flange abutting the exterior of said stopper, and said cover sealing the interior of said container against contamination.

It is an object of this invention to provide a novel means for the reconstitution of dry or lyophilized medication.

More particularly, it is an object of my invention to provide a fluid transfer device which permits such reconstitution in an essentially closed system.

These and other objects and advantages of this invention will be apparent from the detailed description which follows, taken in conjunction with the accompanying drawings.

DESCRIPTION OF PREFERRED EMBODIMENTS

In the drawings:

FIG. 7 is a sectional view of another embodiment of the invention;

FIG. 8 is a perspective view of the embodiment;

FIG. 9 is a perspective view showing the first step in the use of the transfer device with a diluent bottle or vial;

FIG. 10 is a perspective view showing the next step in the use of the transfer device;

FIG. 11 is a perspective view of the next step in the use of the transfer device to transfer fluid between medicament containers;

FIG. 12 is a side sectional view of the transfer device in place between two medicament containers, and operating to transfer liquid from the upper bottle to the lower bottle;

FIG. 16 is a side sectional view showing the operation of the transfer device of FIGS. 7 and 8 wherein liquid medication is being added to the diluent bottle or vial through the cover and transfer device.

Figure 1:
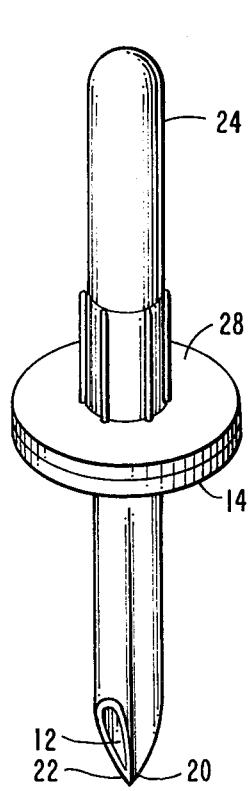
FIG. 1 is a perspective view of one embodiment of the transfer device of my invention.
Figure 4:
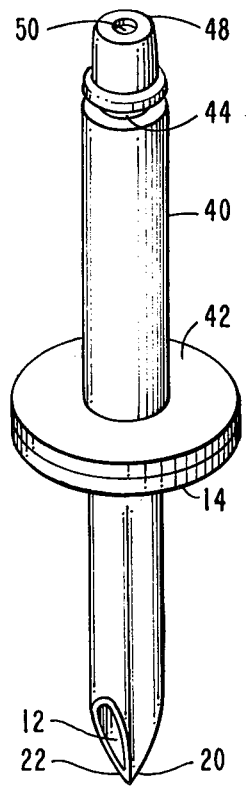
FIG. 4 is a perspective view of another embodiment of this invention.
Figure 6:
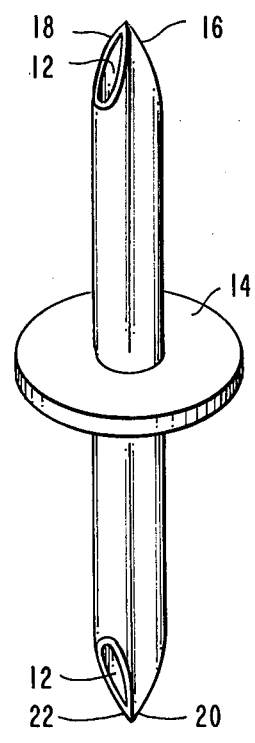
FIG. 6 is a perspective view of the transfer device of FIGS. 1 – 5 with the cover removed.
Figure 2:
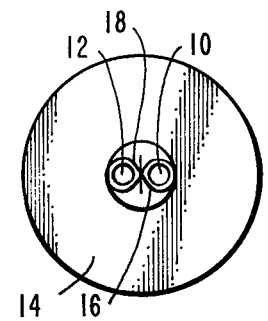
FIG. 2 is an end view of the device of FIG. 1.
Figure 3:
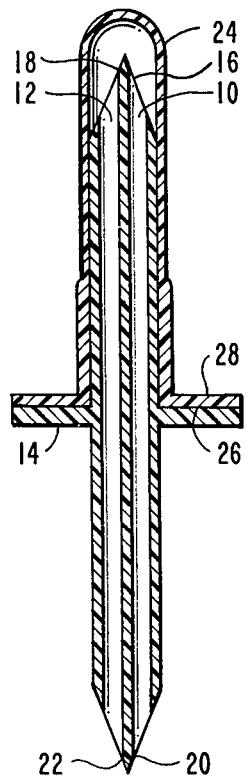
FIG. 3 is a side sectional view along the line 3—3 of FIG. 2.
Figure 5:
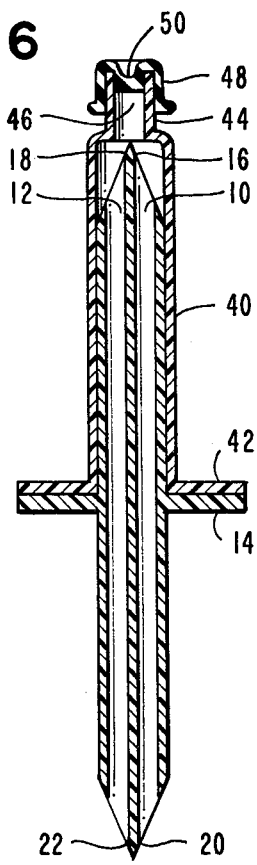
FIG. 5 is a side sectional view of the device of FIG. 4.
Figure 13:
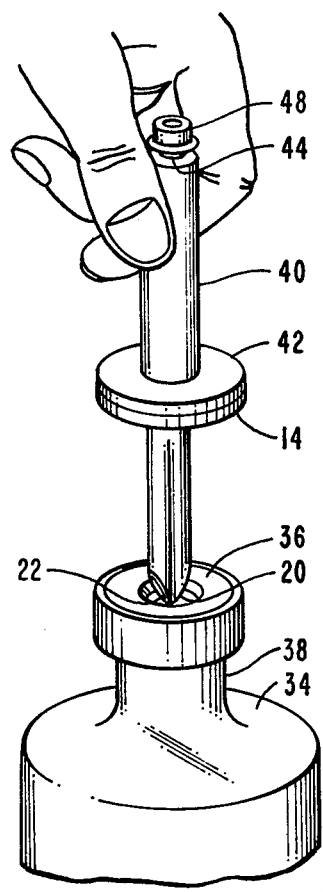
FIG. 13 shows in perspective view the embodiment of the cover of FIGS. 4 and 5 on the transfer device at the beginning of use with a diluent bottle or vial.
Figure 14:
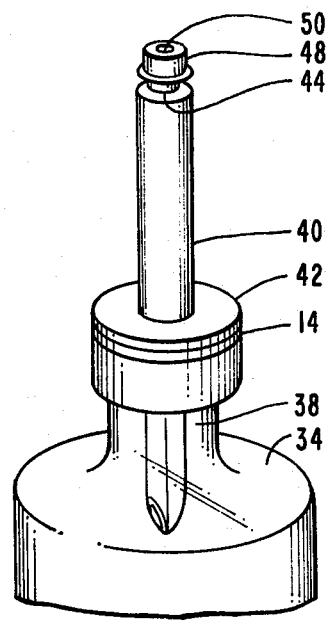
FIG. 14 shows the next step in sequence with the transfer device fully inserted into the stoppered opening of a diluent bottle or vial.

Turning to the drawings in greater detail, the fluid transfer device of FIGS. 1–16 comprises parallel fluid passages 10 and 12 of flange 14. The fluid passages are approximately equal in length with bias-cut ends or openings 16 and 18, and 20 and 22, which are opposed to each other. I have found that if the ends of the fluid passage are oppositely facing or displaced from one another, the downcoming diluent or liquid cannot form a block or slug in the air riser passage. If, however, the ends or openings of the fluid passages face each other, an air block can develop which prevents or stops the fluid transfer. Accordingly, the disposition of the ends of the fluid passages is a significant feature of this invention. Preferably, the one end of the device is covered with a cap 24, the inside of which has an interference or press fit with the exterior surface 26 of the transfer device to form a seal. The cap 24 has a flange portion 28 which abuts flange 14 when the cap is fully advanced over the fluid transfer device.

The use of the device is clearly shown in FIGS. 9 – 12. The transfer device is forced downwardly through the stopper (usually rubber) 30 on the container 32 for the dry or lyophilized material until flange 14 abuts stopper 30. Then, as shown in FIG. 10, the cap 24 is removed with a twisting motion. The combination container 32 and fluid transfer device is then inverted as shown in FIG. 11 over the diluent container 34, which is also usually provided with a rubber stopper 36 in the neck 38 thereof. The points 20 and 22 are forced through stopper 36 until the containers are disposed as shown in FIG. 12. Fluid transfer then occurs automatically, with passage 10 acting as a diluent or liquid downcomer and passage 12 acting as a path or riser for the displacement of air from container 32 upwardly into container 34. After transfer is complete, the empty diluent container 34 and the fluid transfer device are removed. The container 32 then contains the reconstituted medicament in sterile form. The container 32 can be used in a variety of ways. Typically, its contents are administered using a conventional intravenous solution set.

Figure 15:
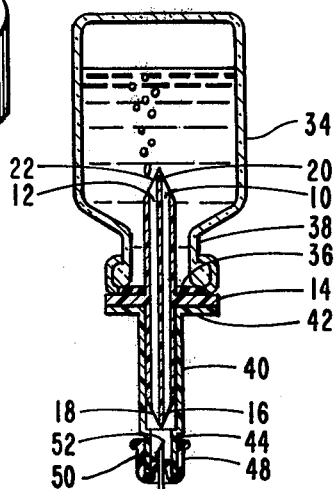
FIG. 15 is a side sectional view showing the operation of the apparatus of FIGS. 13 and 14 wherein liquid medication is being added to the diluent bottle or vial through the cover and transfer device.

FIGS. 4, 5, and 13 – 15 show another embodiment of the cap of my invention. In this embodiment, the cap 40 has a flange portion 42. The cap 40 seals on the transfer device as previously described. The cap 40 has a projection 44 provided with an opening 46 at the end opposite flange 42. The projection is covered by an imperforate cap 48, which is normally resilient, and held on projection 44 with a snap or interference fit. The center of cap 48 is dished and has a central diaphragm 50 which is adapted to be pierced with the needle 52 of a syringe or vial injector. In this way, as shown in FIG. 15, a liquid medication can be withdrawn from or added to the diluent bottle or vial. It is to be understood that thereafter, the cap 40 can be removed and transfer carried out with a second bottle as shown in FIGS. 11 and 12.

The embodiment of FIGS. 7, 8 and 16 has a cap 54 having a flange 56. The cap 54 seals on the transfer device as hereinbefore explained. The cap 54 has a projection 58 provided with an opening 60 at the end opposite flange 56. The projection 58 is covered by imperforate cap 62 which is held in projection 58 with a snap or interference fit. The center of cap 62 is dished and has a central diaphragm 64 for piercing with a needle 66 of a syringe or vial injector. The cap 54 also has an airway 68 provided with a filter 70 so that filtered air can enter cap 54 as medication is withdrawn into the syringe. The flow of air is, of course, reversed in the case of the addition of medication from the syringe or vial injector to the diluent bottle or vial.

Having fully described the invention, it is intended that it be limited only by the lawful scope of the appended claims.

I claim:

1. The combination of a fluid transfer device comprising two parallel fluid passages within a single elongated rigid member having cutting ends, said rigid member being carried by a generally disk-like flange disposed midway between the ends of said rigid member which is generally perpendicular to said passages, said two fluid passages being of equal length and coterminous, and the openings at the cutting ends of adjacent fluid passages being oppositely facing, and a common cover for the one end of each said fluid passages, said cover abutting said flange and forming a fluid tight seal with the exterior of said rigid member by an interference or press fit between the interior of said cover and the exterior of said rigid member, the combination of a fluid transfer device comprising two parallel fluid passages within a single elongated rigid member having cutting ends, said rigid member being carried by a generally disk-like flange disposed midway between the ends of said rigid member which is generally perpendicular to said passages, said two fluid passages being of equal length and coterminous, and the openings at the cutting ends of adjacent fluid passages being oppositely facing, and a common cover for the one end of each of said fluid passages, said cover abutting said flange and forming a fluid tight seal with the exterior of said rigid member by an interference or press fit between the interior of said cover and the exterior of said rigid member, said cover being provided at the end thereof opposite said flange with an imperforate removable resilient cap which can be pierced by a needle and an adjacent airway provided with air filtration means, and a medicament container having an open end, an imperforate rubber stopper in said open end which seals said container, the other end of said rigid member piercing said stopper and said flange abutting the exterior of said stopper, and said cover sealing the interior of said container against contamination.

* * * * *